(12) United States Patent
Friebe et al.

(10) Patent No.: US 10,943,334 B2
(45) Date of Patent: Mar. 9, 2021

(54) METHOD AND SYSTEM FOR REPRESENTATION OF VEHICLE SURROUNDINGS WITH REDUCED ARTEFACTS

(71) Applicant: Continental Automotive GmbH, Hannover (DE)

(72) Inventors: Markus Friebe, Gefrees (DE); Sukumar Srikanth, Bangalore (IN); Pavannag Prabhakar, Bangalore (IN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/520,893

(22) Filed: Jul. 24, 2019

(65) Prior Publication Data

US 2020/0034953 A1   Jan. 30, 2020

(30) Foreign Application Priority Data

Jul. 24, 2018   (EP) ..................................... 18185214

(51) Int. Cl.
| | |
|---|---|
| *G06T 5/00* | (2006.01) |
| *G06T 7/80* | (2017.01) |
| *G06K 9/00* | (2006.01) |
| *G06T 5/50* | (2006.01) |
| *H04N 5/225* | (2006.01) |
| *H04N 5/232* | (2006.01) |
| *H04N 5/247* | (2006.01) |
| *H04N 5/262* | (2006.01) |
| *B60R 1/00* | (2006.01) |

(52) U.S. Cl.
CPC .......... *G06T 5/005* (2013.01); *G06K 9/00791* (2013.01); *G06T 5/50* (2013.01); *G06T 7/80* (2017.01); *H04N 5/2253* (2013.01); *H04N 5/23267* (2013.01); *H04N 5/247* (2013.01); *H04N 5/2628* (2013.01); *B60R 1/00* (2013.01); *B60R 2300/105* (2013.01); *B60R 2300/30* (2013.01); *G06T 2207/30252* (2013.01)

(58) Field of Classification Search
CPC .. G06T 5/005; H04N 5/23267; H04N 5/2628; G06K 9/00791
USPC ........................................................ 375/148
See application file for complete search history.

(56) References Cited

U.S. PATENT DOCUMENTS

| | | |
|---|---|---|
| 2014/0232869 A1 | 8/2014 | May et al. |
| 2014/0347470 A1 | 11/2014 | Zhang et al. |

OTHER PUBLICATIONS

Extended European Search Report and Examination Report for European Patent Application No. 18185214.6, dated Jan. 28, 2019, 8 pages, European Patent Office, Munich, Germany.

*Primary Examiner* — On S Mung
(74) *Attorney, Agent, or Firm* — W. F. Fasse

(57) ABSTRACT

A system is configured to repair artefacts in image data when representing vehicle surroundings. This involves: detecting an artefact-comprising area of a vehicle camera for a first time point, creating a reconstructed version of the artefact-comprising area from image data of an adjacent image area, determining a sample point of the artefact-comprising area, transforming the sample point to a new location predicted for a second time point, determining whether the new location still lies within the artefact-comprising area, and if so updating the artefact-comprising area in the image for the second time point by using motion-compensated image data from the reconstructed version of the sample point from the first time point.

13 Claims, 3 Drawing Sheets

METHOD AND SYSTEM FOR REPRESENTATION OF VEHICLE SURROUNDINGS WITH REDUCED ARTEFACTS

FIELD OF THE INVENTION

The present invention relates to a method and apparatus for representation of a vehicle surroundings inside a vehicle.

BACKGROUND INFORMATION

A vehicle may include a driver assistance system that displays a vehicle surroundings for a vehicle passenger inside the vehicle in a display device, such as a screen. Such a driver assistance system may also be referred to as a surround-view-system and usually comprises one or more vehicle cameras which are mounted on the vehicle and have different viewing areas or allow different viewing angles on the vehicle surroundings.

For such a surround-view-system, representing the surroundings as good as possible is desirable. The vehicle cameras mounted on the outside of the vehicle are able to provide information of the surroundings. However, such externally mounted camera lenses may be prone to have static artefacts, for example, through soil or dirt thereon. Therefore, an imager may capture the artefacts which become part of corresponding images. Consequently, when such images are used to represent the surroundings, the artefacts become also part of the view that is represented to the vehicle passenger which can mislead the passenger in different ways. It would therefore be desirable to avoid such artefacts. In principle, it would be conceivable to remove the soil or dirt by a cleaning system, similar to that of a headlight, however, this requires additional conduits, a larger water tank etc.

SUMMARY OF THE INVENTION

It is therefore an object of the invention to provide a possibility for improved representation of a vehicle surroundings in a vehicle.

This object can be achieved by a method and a system according to various aspects of the invention as set forth herein.

A first aspect of the invention provides a method of representing a vehicle surroundings in a vehicle. The method can be performed with a data processing means which may comprise a processor, a memory means for storing program code etc. The method comprises the following steps:

First, at least one artefact-comprising area of an vehicle camera for a first time point t-1 is detected. The artefact-comprising area may be an area of an imager. In other words, an area on the imager may be detected where an artefact is present.

Further, the detected artefact-comprising area is at least temporarily reconstructed by image data of an adjacent image area. These image data may comprise texture data or the like. By way of example, reconstructing may comprise fading the texture at edges of the artefact-comprising area right into it, a smooth color transition from the texture at the edge may be generated. In addition, other reconstructing and/or smoothing methods are conceivable.

Further, at least one sample point of the artefact-comprising area is determined.

The determined world point is transformed to a new location predicted for a second time point t. The second time point is after the first time point, wherein the first time point is preferably a current time point and, consequently, the second time point is in the future. The predicted new location may differ from a current location because the vehicle may move between the first and second time points.

Further, it is determined whether the predicted new location still lies within the artefact-comprising area. This may e.g. be possible at a relatively low driving speed of the vehicle, so that the represented images change only slightly between the first and the second time point.

In case that the predicted new location still lies within the artefact-comprising area, the artefact-comprising area is updated by using a motion compensated reconstructed sample point from the previous first time point t-1. In other words, an image patch sample may be updated by using a motion compensated previous image patch sample.

With this configuration the invention provides a possibility for improved representation of a vehicle surroundings in a vehicle. In particular, artefacts occurring within images of the vehicle camera can be repaired. For example, a soiled or dirt area within an image can be repaired before representing the image to a vehicle passenger.

According to an embodiment of the invention, the method may further comprise determining whether the predicted new location lies outside the artefact-comprising area, and if so, the artefact-comprising area may be rendered by using a sample point of an image captured at the first time point t-1. In other words, the current image sample may be rendered with one or more previous samples, if the predicted new location lies outside the artefact-comprising area. Thus, the sample can be replaced by a particularly suitable replacement sample.

In another embodiment, it may further be determined, by means of a motion vector determined and/or obtained from vehicle motion data, from which particular vehicle camera of a plurality of vehicle camera having different viewing areas the image of the first time point t-1 is provided. By way of example, the vehicle may comprise a respective camera at the front, on both lateral sides and at the rear. Depending on the motion vector, the image used for rendering the artefact-comprising area is chosen from one of these cameras. Therefore, if the new location would be located in the viewing area of the left side camera, the previous view image of this camera would be taken. This achieves a particularly high image quality.

According to an embodiment, the artefact may be caused by soil or dirt present on a lens of the vehicle camera. In principle, any camera mounted outside the vehicle can be affected. Thus, artefacts caused by dirt or soil may be repaired well.

In an embodiment, determining the sample point may comprise determining of a world point of the sample point. The world point may be computed by the data processing means.

According to an embodiment, the detected artefact-comprising area may at least temporarily be treated and/or represented as a blind spot patch. The blind spot patch may be updated or rendered then.

In an embodiment, the motion data for motion compensation and/or transferring points may be obtained by the vehicle's odometry. This can e.g. obtained from single or fused sensor data, a self-motion estimation of video data, tachometer data or the like. Thus, data already existing in the vehicle is used to repair artefacts.

According to an embodiment, the world point may be determined on basis of calibration data of the vehicle camera. The world point may be computed using camera calibration data. These may e.g. be kept in a memory and/or provided by the camera or a control unit of the vehicle etc. This allows the required hardware to be kept to a minimum.

In an embodiment, at least the step of determining the world point may be performed iteratively until all sample points of the artefact-comprising area are processed. In particular, the method according to one or more of the above embodiments may be performed in an iterative manner. Thus, it is also possible to improve an artefact-comprising area which has several or even a plurality of sample points.

A further aspect of the invention relates to a system for displaying or representing a vehicle surroundings in a vehicle. It should be noted that the system may be adapted to comply with one or more embodiments of the above method. In particular, the above method may be performed with this system.

The system comprises at least one vehicle camera configured to capture a viewing area surrounding the vehicle. By way of example, the vehicle may comprise one camera at front, a camera on each lateral side and a camera at rear. Further, the system comprises a memory means configured to store at least one image captured by the at least one vehicle camera at the first time point t-1. The system further comprises a data processing unit configured to detect at least one artefact-comprising area of the vehicle camera for a first time point t-1, reconstruct the detected artefact-comprising area by image data of an adjacent image area, determine at least one sample point of the artefact-comprising area, transform the determined sample point to a new location predicted for a second time point t, determine whether the predicted new location still lies within the artefact-comprising area, and update the artefact-comprising area by using a motion compensated reconstructed sample point from the previous first time point t-1 or render, if the predicted new location lies outside the artefact-comprising area, the artefact-comprising area by using a sample point of the at least one image stored in the memory means.

The system allows to improve representation of a vehicle surroundings in a vehicle. In particular, artefacts occurring within images of the vehicle camera can be repaired. For example, a soiled or dirt area within an image can be repaired before representing the image to a vehicle passenger.

BRIEF DESCRIPTION OF THE DRAWINGS

In the following, exemplarily embodiments of the invention will be explained in more detail with reference to the accompanying figures.

DETAILED DESCRIPTION OF EXAMPLE EMBODIMENTS OF THE INVENTION

The figures are merely schematic representations and serve only to illustrate the invention. Identical or equivalent elements are consistently provided with the same reference symbols.

Figure 1:
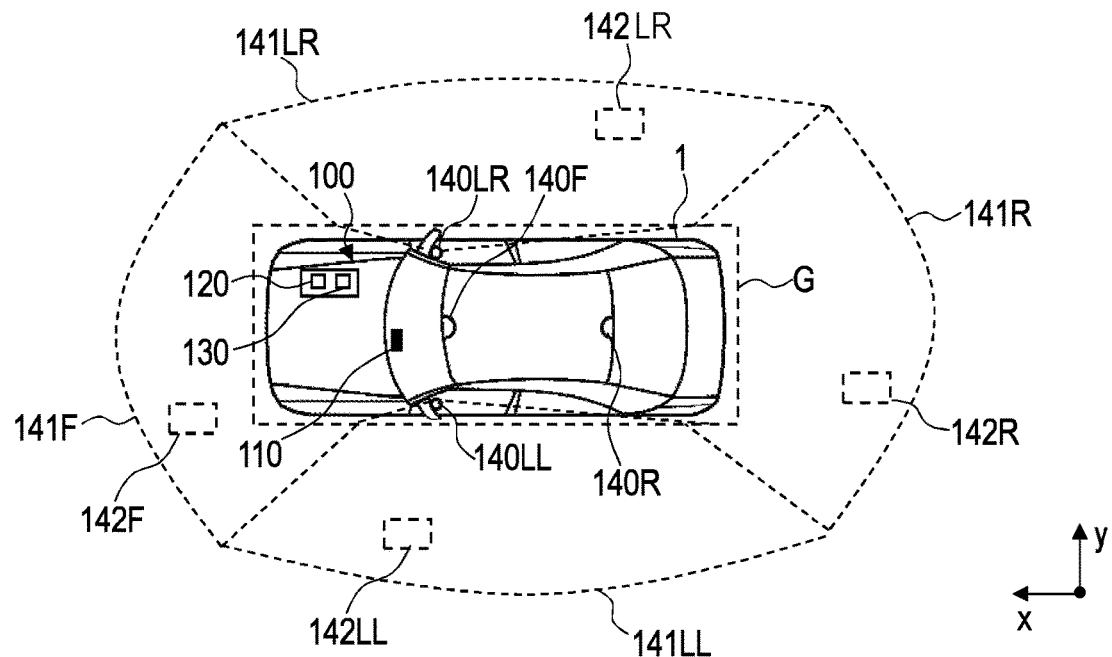
FIG. 1 shows a vehicle comprising a driver assistance system according to one aspect which is configured to perform a method according to a further aspect.

FIG. 1 shows a vehicle 1 standing on a ground plane G and movable in the directions x and y. Vehicle 1 has a system 100 in the form of a driver assistance system and/or surround-view system. The system 100 allows a vehicle passenger to obtain a surround view of a current vehicle surroundings inside the vehicle.

For this purpose, the system 100 has a display device 110 arranged in the interior of the vehicle 1 in form of a screen capable for visually representing an image I. Furthermore, the system 100 has a data processing device 120, which interacts with the display device 110, with at least one processor and a memory device 130. In addition, the system 100 has a plurality of vehicle cameras 140F, 140R, 140LL, 140LR mounted at different positions of the vehicle 1 and having different view areas 141F, 141R, 141LL, 141LR. In particular, the camera 140F is arranged at front, the camera 140R is arranged at rear, the camera 140LL is arranged lateral left and the camera 140LR is arranged lateral right. The viewing areas 141F, 141R, 141LL, 141LR can be detected as the respective camera image I_F, I_R, I_LL, I_LR and are reproduced directly in the display device 110 and possibly stored (temporarily) in the memory device 130. For representation, the camera images I_F, I_R, I_LL, I_LR are combined by the data processing device 120 to form the display image I (see FIGS. 2A-2C).

Since the cameras 140F, 140R, 140LL, 140LR are mounted on the outside of the vehicle 1, in particular their lenses are prone to have static artefacts. More specifically, soil or dirt may be present on the lenses so that an imager will also capture the soil or dirt which thus becomes part of the raw image data. In FIG. 1, exemplary artefact-comprising areas 142F, 142R, 142LL, 142LR caused by such a soiled lens are indicated by dashed rectangles.

In order to still be able to display an image I without artefacts, the system 100 can be operated with a method described below with reference to FIGS. 2A-2C and 3. By way of example, the method will be explained with reference to artefact-comprising area 142F, however, the method may equally or at least similarly be applied to the other artefact-comprising areas 142R, 142LL and 142LR.

In principle, representing the vehicle surroundings in the display device 110 should preferably be performed in real time at a current time t, i.e., the represented image I contains the vehicle surroundings at a current, second time point t. This is indicated below and in FIGS. 2A-2C by a time reference [t] in the reference symbols. Likewise, accordingly, a first time point t-1 preceding the current second time point t is referenced as [t-1] in FIGS. 2A-2C.

In a step S1, the respective artefact-comprising area 142F is detected for the first time point t-1. This can be done, for example, by a suitable algorithm, which is implemented in the data processing device 120. As a result, it is known whether such an area exists and, optionally, where within the image I_F this area is located.

In a step S2, the detected artefact-comprising area 142F is reconstructed by image data of an adjacent image area. By way of example, these image data may comprise texture data or the like, wherein reconstructing may comprise fading the texture at edges of the artefact-comprising area 142F right into it, a smooth color transition from the texture at the edge may be generated. Alternatively or in addition, other reconstructing and/or smoothing methods are conceivable. The resulting image containing the reconstructed artefact-comprising area 142F may be stored in the memory device 130.

In a step S3, at least one sample point of the artefact-comprising area 142F is determined. This can be done, for example, by a suitable algorithm, which is implemented in the data processing device 120. Further, for this sample point, a world point may be determined and/or computed using camera calibration parameters which are known for the system 100.

Before, during or after determining the sample point and/or world point, input data is collected. These input data may comprise ego-motion data of the vehicle 1, in particular a motion vector mv_x in x-direction, a motion vector in y-direction, previous surround view images I_F, I_R, I_LL, I_LR captured at the first time point t-1 and a previous rendered sample point of the artefact-comprising area 142F which also refers to the first time point t-1.

In a step S4, for the considered sample point, the sample point and/or the corresponding world point is transferred to a new location which is predicted for the current, second time point t. Determining the new location and/or transferring the sample and/or world point is based on odometry data of the vehicle 1. By way of example, these odometry data may be obtained by sensors of the vehicle 1.

In a step S5, it is determined whether the transferred point or the new location, respectively, lies within or outside the artefact-comprising area 142.

In a step S5A, if the transferred point lies within the artefact-comprising area 142, an image I_142F[t] having the artefact-comprising area 142 is updated by using a previous motion compensated reconstructed sample point from the previous first time point t-1. This can be generalized to: I_142F[x, y, t]=I_142F[x+mv_x, y+mv_y, t-1], wherein mv_x and mv_y are the motion vectors in x- and y-direction.

Figure 2A:
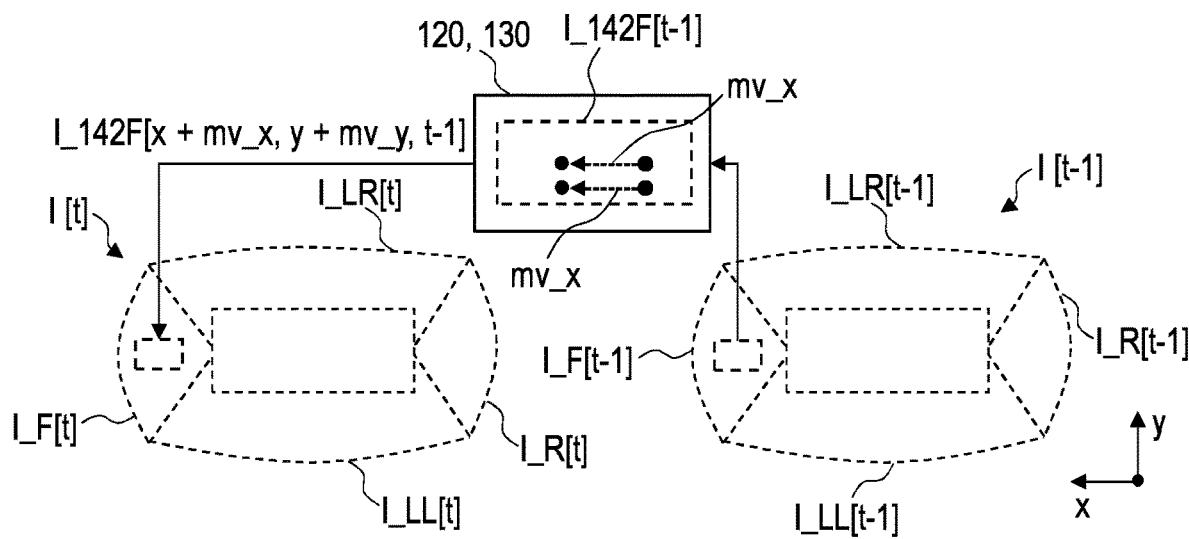
FIG. 2A shows a scheme for a method according to an embodiment of one aspect.

An example for step S5A is illustrated in FIG. 2A, wherein two exemplary sample and/or world points are considered. By way of example, between the first and second time point t-1 and t, the vehicle 1 has moved in x-direction with the motion vector mv_x. Depending on e.g. the vehicle speed, the considered points lie within the artefact-comprising area 142. Therefore, the image I_142F [x, y, t] corresponds to I_142F[x+mv_x, y+mv_y, t-1], wherein in this example the motion vector mv_y is zero. As a result, the image I[t] currently displayed in the display device 110 is thus composed of the updated image I_142F[x, y, t] and the current images I_R[t], I_LL[t], I_LR [t] of the cameras 140R, 140LL, 140LR.

In an optional step 5B, if the transferred point lies outside the artefact-comprising area 142, the current image I_142F [t] is rendered with previous sample points from one of the cameras 140F, 140R, 140LL, 140LR. This can be generalized to: I_142F[x, y, t]=I_F, I_R, I_LL or I_LR [x+mv_x, y+mv_y, t-1], wherein mv_x and mv_y are the motion vectors in x- and y-direction. Thereby, the motion vector mv_x, mv_y decides from which previous camera image I_F, I_R, I_LL or I_LR the samples will be taken. For example, I_F, I_R, I_LL or I_LR may also be taken from step S2.

Figure 2B:
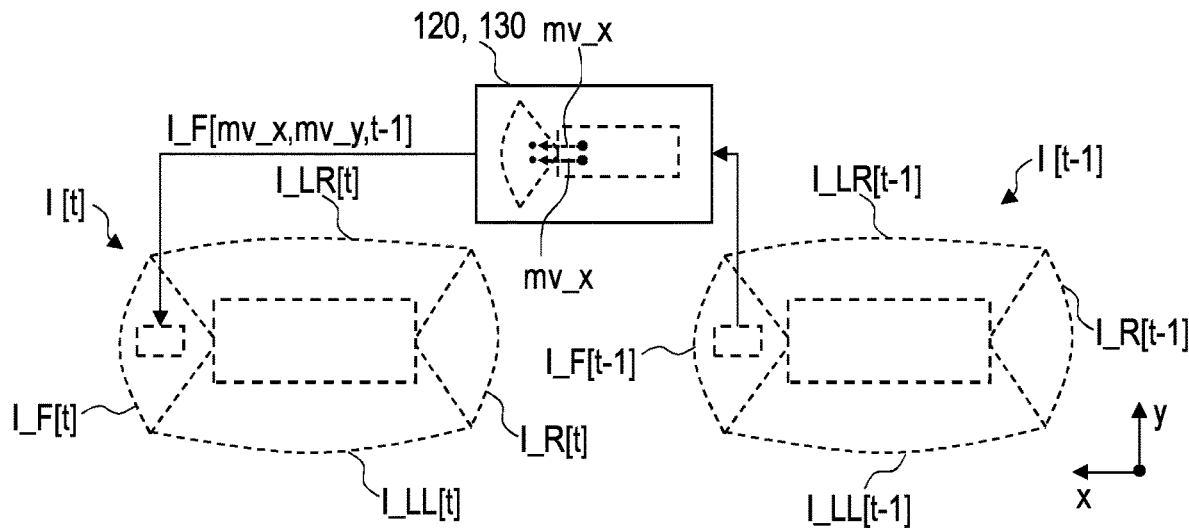
FIG. 2B shows a scheme for a method according to another embodiment of one aspect.

An example for step S5B is illustrated in FIG. 2B, wherein two exemplary sample and/or world points are considered. By way of example, between the first and second time point t-1 and t, the vehicle 1 has moved in x-direction with the motion vector mv_x. In contrast to the example shown in FIG. 2A, here the considered points lie outside artefact-comprising area 142 but still within the viewing area 141F of the camera 140F. Therefore, the image I_142F[x, y, t] is rendered by using the motion compensated previous sample I_F[x+mv_x, y+mv_y, t-1], wherein in this example the motion vector mv_y is zero.

Figure 2C:
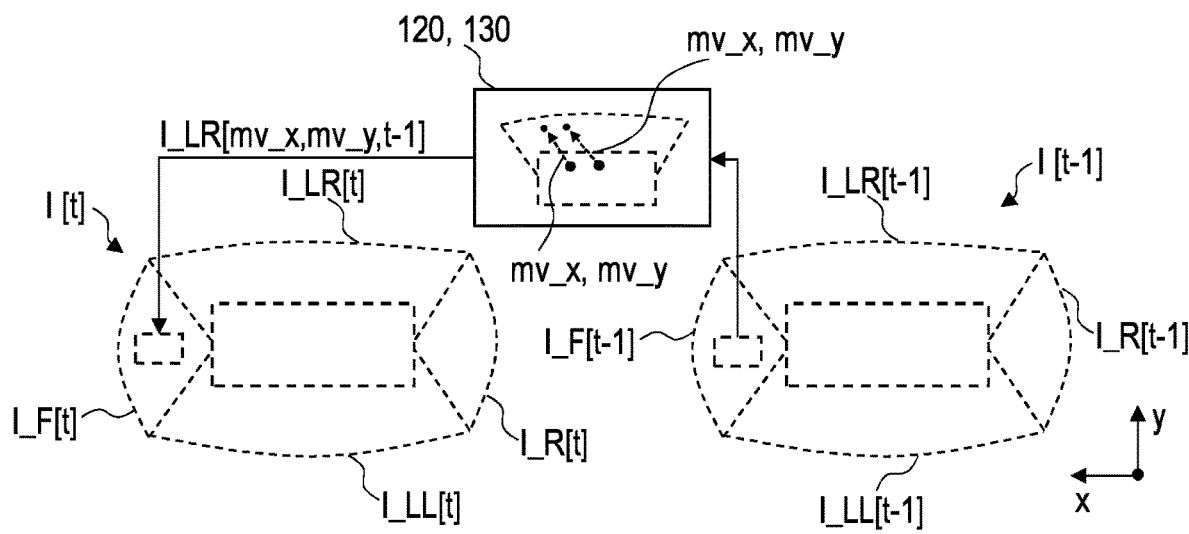
FIG. 2C shows a scheme for a method according to a further embodiment of one aspect.

FIG. 2C illustrates a further example for step 5B. In contrast to the example shown in FIG. 2B, the motion vector mv_y is not zero but greater than zero. By way of example, the motion vector mv_y has an amount that the two exemplary sample and/or world points lie outside of both the artefact-comprising area 142 and the viewing area 141F of the camera 140F. Rather, the considered points lie within the view area 141LR of the camera 140LR. Therefore, the image I_142F[x, y, t] is rendered by using the motion compensated previous sample I_LR[mv_x,mv_y,t-1].

The above steps S1 to S5A or S5B are done in an iterative manner until every sample of the artefact-comprising area 142 is processed.

Figure 3:
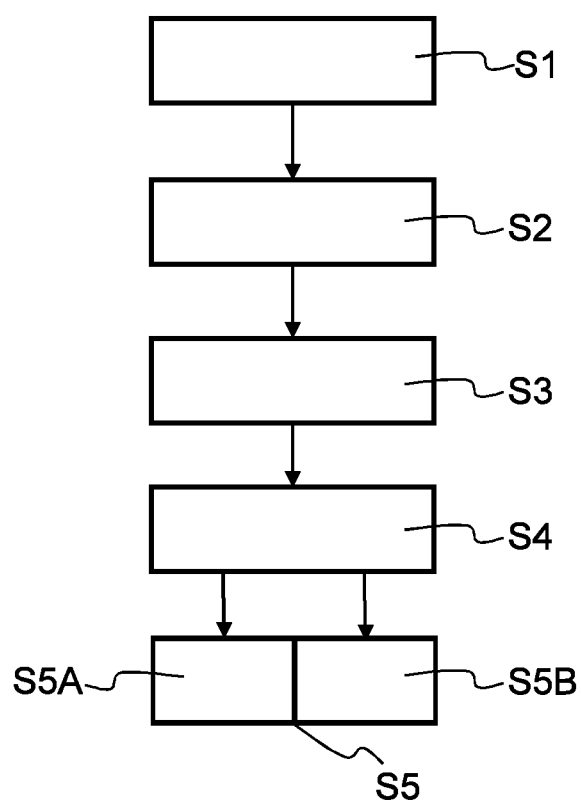
FIG. 3 shows a flow chart for a method according to one aspect.

FIG. 3 shows the method described above in a flow chart.

The invention claimed is:

1. A method of representing a vehicle surroundings in a moving vehicle, comprising steps:
   with a vehicle camera of the moving vehicle, capturing a first image of the vehicle surroundings at a first time point and a second image of the vehicle surroundings at a second time point,
   detecting an artefact-comprising area in the first image captured at the first time point, wherein the artefact-comprising area in the first image depicts an artefact of the vehicle camera, wherein the artefact is caused by soil or dirt present on a lens of the vehicle camera,
   creating a reconstructed version of the artefact-comprising area in the first image captured at the first time point by using image data that comprises texture data of an adjacent image area that is adjacent to the artefact-comprising area in the first image captured at the first time point,
   determining a sample point of the artefact-comprising area in the first image captured at the first time point,
   transforming the sample point to a new location of the sample point predicted for the second time point based on a motion of the vehicle,
   determining whether the new location still lies within the artefact-comprising area, and
   when the new location still lies within the artefact-comprising area, updating the artefact-comprising area in the second image captured at the second time point by using reconstructed image data of the sample point in the reconstructed version of the artefact-comprising area in the first image captured at the first time point and motion-compensating the reconstructed image data to the new location for the second time point based on the motion of the vehicle.

2. The method according to claim 1, further comprising, when the new location lies outside the artefact-comprising area, rendering the artefact-comprising area in the second image captured at the second time point by using image data of the sample point of the first image captured at the first time point.

3. The method according to claim 2, further comprising determining, by a motion vector obtained from vehicle motion data regarding the motion of the vehicle, which particular vehicle camera of a plurality of vehicle cameras of the vehicle having different viewing areas captured the first image at the first time point.

4. The method according to claim 1, wherein determining the sample point comprises determining a world point of the sample point in a real world space.

5. The method according to claim 1, further comprising obtaining motion data regarding the motion of the vehicle, for performing the motion compensation, by an odometry system of the vehicle.

6. The method according to claim 4, wherein the world point is determined based on calibration data of the vehicle camera.

7. The method according to claim 1, further comprising iteratively repeating the step of the determining of the sample point respectively for plural sample points until all sample points of the artefact-comprising area have been determined.

8. A system for representing a vehicle surroundings in a moving vehicle, comprising:
- a vehicle camera of the moving vehicle configured to capture a first image of the vehicle surroundings at a first time point and a second image of the vehicle surroundings at a second time point,
- a memory configured to store the first image captured at the first time point and the second image captured at the second time point, and
- a data processing unit configured to:
    - detect an artefact-comprising area in the first image captured at the first time point, wherein the artefact-comprising area in the first image depicts an artefact of the vehicle camera, wherein the artefact is caused by soil or dirt present on a lens of the vehicle camera,
    - create a reconstructed version of the artefact-comprising area in the first image captured at the first time point by using image data that comprises texture data of an adjacent image area that is adjacent to the artefact-comprising area in the first image captured at the first time point,
    - determine a sample point of the artefact-comprising area in the first image captured at the first time point,
    - transform the sample point to a new location of the sample point predicted for the second time point based on a motion of the vehicle,
    - determine whether the new location still lies within the artefact-comprising area, and
    - when the new location still lies within the artefact-comprising area, update the artefact-comprising area in the second image captured at the second time point by using reconstructed image data of the sample point in the reconstructed version of the artefact-comprising area in the first image captured at the first time point and motion-compensating the reconstructed image data to the new location for the second time point based on the motion of the vehicle.

9. The system according to claim 8, wherein the data processing unit is further configured, when the new location lies outside the artefact-comprising area, to render the artefact-comprising area in the second image captured at the second time point by using image data of the sample point of the first image captured at the first time point.

10. The method according to claim 7, further comprising iteratively repeating the steps of the transforming of the sample point to the new location, the determining of whether the new location lies within the artefact-comprising area, and the updating of the artefact-comprising area, respectively for all of the sample points of the artefact-comprising area.

11. The method according to claim 1, wherein the artefact comprises a temporary static artefact of the vehicle camera caused by the soil or the dirt present on the lens of the vehicle camera.

12. The method according to claim 1, wherein the artefact comprises a static artefact caused by the soil or the dirt present on the lens of the vehicle camera.

13. The method according to claim 1, wherein the artefact-comprising area is an area of an imager of the vehicle camera, at which area of the imager the soil or the dirt present on the lens of the vehicle camera is imaged.

* * * * *